United States Patent [19]
Billmers et al.

[11] Patent Number: 6,007,614
[45] Date of Patent: *Dec. 28, 1999

[54] STARCH ESTERS AS MOISTURE VAPOR BARRIER COATINGS

[75] Inventors: Robert L. Billmers, Stockton; Gregory A. Sweeney, Lebanon, both of N.J.

[73] Assignee: National Starch and Chemical Investment Holding Corporation, Del.

[ * ] Notice: This patent is subject to a terminal disclaimer.

[21] Appl. No.: 09/000,525

[22] Filed: Dec. 3, 1997

[51] Int. Cl.$^6$ ................................................. C09D 103/06
[52] U.S. Cl. .................................... 106/207.1; 106/207.2; 106/207.3; 106/207.4; 106/207.5; 427/385.5; 427/391; 428/41.8; 428/352; 428/532; 428/533; 524/51
[58] Field of Search ...................... 536/48, 110; 428/352, 428/41.8, 532, 533; 524/47, 51, 53; 106/207.1, 207.2, 207.3, 207.4, 207.5; 427/385.5, 391

[56] References Cited

U.S. PATENT DOCUMENTS

| | | | |
|---|---|---|---|
| 3,746,558 | 7/1973 | Berkhout et al. | 106/213 |
| 3,839,320 | 10/1974 | Barrer | 260/233.5 |
| 3,891,624 | 6/1975 | Boonatra et al. | 260/233.3 R |
| 4,011,392 | 3/1977 | Rudolph et al. | 536/108 |
| 4,095,992 | 6/1978 | Rudolph et al. | 106/213 |
| 5,321,132 | 6/1994 | Billmers et al. | 536/48 |
| 5,360,845 | 11/1994 | Billmers et al. | 524/51 |
| 5,434,201 | 7/1995 | Neigel et al. | 524/51 |
| 5,498,224 | 3/1996 | Kauffman et al. | 493/39 |
| 5,945,468 | 8/1999 | Atkinson et al. | 524/51 |

FOREIGN PATENT DOCUMENTS

| | | | |
|---|---|---|---|
| 0 545 228 A1 | 6/1993 | European Pat. Off. | D21H 27/10 |
| 0 547 551 A1 | 6/1993 | European Pat. Off. | C08L 3/00 |

*Primary Examiner*—David Brunsman
*Attorney, Agent, or Firm*—Eugene Zagarella, Jr.

[57] ABSTRACT

Moisture vapor barrier coating composition comprising:
  a) a starch ester having 2 to 8 carbon atoms in the ester component and a degree of substitution (DS) of from 1.1 to 2.2;
  b) a hydrophobic plasticizer; and
  c) water.

18 Claims, No Drawings

STARCH ESTERS AS MOISTURE VAPOR BARRIER COATINGS

BACKGROUND OF THE INVENTION

This invention relates to moisture vapor barrier coatings made from selected modified starch esters and more particularly starch esters having an ester component of 2 to 8 carbon atoms and an intermediate DS of from 1.1 to 2.2.

In packaging and other applications a moisture barrier is sometimes needed to prevent moisture vapor transmission through the paper or other substrate material. In many cases, plastic materials such as polyethylene have been used to provide a moisture barrier or water resistant coating. While these materials are generally useful as protective coatings, they are not useful in paper product applications where repulpable and recyclable products are desired.

Starch based materials have been used in some coating applications. For example, U.S. Pat. No. 3,746,558 issued Jul. 17, 1973 to F. Berkhout et al. discloses an aqueous suspension of hydrophobic, low DS starch esters which can be used to provide water resistant coatings. U.S. Pat. No. 4,095,992 issued Jun. 20, 1978 to S. Rudolph et al. discloses mixed starch esters of mono- and polycarboxylic acid anhydrides as thermosetting, hydrophobic coatings that provide water resistance. European Patent No. 0 545 228 A1 published Jun. 9, 1993 shows the use of a mixture of modified starch and a synthetic polymer as a moisture barrier in moisture resistant sacks. Another European Patent No. 0 547 551 A1 published Jun. 23, 1993 discloses compositions comprising modified starch, gelatin, plasticizer, water and lipid as edible films which are effective in providing water, lipid, solute, gas, physical or microbial barriers in foods.

While the starch materials noted above do provide a moisture barrier and/or water resistance in different applications, they do not provide a thermoplastic coating material which can be readily processed to form a continuous film coating with good water vapor barrier properties.

SUMMARY OF THE INVENTION

Now it has been found that moisture vapor barrier coatings made from selected starch esters provide good water barrier properties as well as being biodegradable and environmentally friendly making them particularly useful in paper applications where repulpability and recyclabillity are desired.

More particularly, this invention relates to moisture vapor barrier coating compositions comprising:

a) a starch ester having 2 to 8 carbon atoms in the ester component and a degree of substitution (DS) of from 1.1 to 2.2;

b) a hydrophobic plasticizer; and c) water.

This invention also involves the process of preparing a moisture vapor barrier coated substrate wherein the moisture vapor barrier coating composition as described herein is applied as a latex to a substrate and then heated to a suitable temperature causing the particles to melt and flow into a continuous film.

DETAILED DESCRIPTION OF THE INVENTION

The present invention provides a moisture vapor barrier coating composition comprising starch ester compounds having 2 to 8 carbon atoms in the ester component and a degree of substitution of from 1.1 to 2.2. These starch esters comprise ester compounds having the formula:

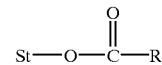

where St is the starch base material and R is an alkyl, aryl, alkenyl, alkaryl or aralkyl of 1 to 7 carbon atoms, and preferably an alkyl or alkenyl of 1 to 4 carbon atoms. More preferably, the ester compound will contain an R group which is an alkyl of 1 to 2 carbon atoms. Starch esters of this type include starch acetate, starch propionate, starch butyrate, starch hexanoate, starch benzoate, blends of two or more of these esters, for example starch acetate/starch propionate, and mixed starch esters where the starch contains two or more different ester substituants, e.g., starch acetate/propionate, i.e., the ester having the formula such as:

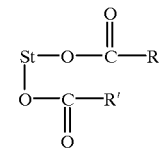

where R and R' represent different substituent groups as the R group defined above.

Additionally, the starch esters, as defined above, will have a DS (degree of substitution) of from 1.1 to 2.2, preferably from 1.2 to 1.9 and more preferably from 1.4 to 1.6. Stated differently, the starch ester will have a DS that is high enough to prevent water dispersion and is high enough to make the starch thermoplastic, i.e., having an anhydrous (without moisture or plasticizer) $T_g$ below the decomposition temperature of about 200 to 220° C. The term "degree of substitution" (DS) as used herein indicates the average number of sites per anhydroglucose unit of the starch molecule on which there are substituent groups.

The starch esters having intermediate DS as used in this invention can be prepared by reacting starch with organic acid anhydrides in a solvent system such as pyridine. An aqueous method for preparing the starch esters was recently disclosed in U.S. Pat. No. 5,321,132 issued to R. Billmers et al. on Jun. 14, 1994 and is hereby incorporated by reference. This method involves an aqueous one-step process wherein starch is reacted with high treatment levels of organic acid anhydride and high concentrations of alkaline reagents.

The base starch material used in the starch esters of this invention may be those derived from any plant source including corn, potato, wheat, rice, sago, tapioca, waxy maize, sorghum and high amylose starch, i.e., starch having at least 45% and more particularly at least 65% amylose content, such as high amylose corn. Starch flours may also be used. Also included are the conversion products derived from any of the former bases, such as dextrins prepared by hydrolytic action of acid and/or heat, fluidity or thin boiling starches prepared by enzyme conversion or mild acid hydrolysis, oxidized starches prepared by treatment with oxidants such as sodium hydpochlorite, and derivatized starches such as cationic, anionic, amphoteric, non-ionic, and crosslinked. Stated differently, the starch material may comprise a granular or dispersed starch. By dispersed or non-granular starch is meant any starch which has had its structure disrupted or removed, i.e., is destructurized by either thermal (jet cooking, boiling water bath), mechanical (drum drying, spray drying, extrusion), or chemical (use of liquid ammonia, dextrinization, subject to high levels of caustic) means prior to derivatization.

The coating composition will contain a plasticizer and water in addition to the starch ester release agent. The plasticizer will be a non-volatile organic material which is compatible with the starch ester. The plasticizer should be non-soluble in water, i.e., less than 5% dissolved in water and is hydrophobic wherein it absorbs low levels of moisture at high humidity, i.e., have a moisture content of less than 20%, preferably less than 15% by weight at 90% relative humidity (RH) and 23° C. The plasticizer material is also liquid at ambient or room temperature and is used in sufficient amount to lower the Tg (glass transition temperature) of the starch ester to the desired processing range of about 75 to 200° C., preferably 80 to 135° C. This is necessary to facilitate the melting of the coating during drying or calendering steps such as used in the papermaking process. Typically the plasticizer will have a molecular weight of less than about 10,000. A variety of plasticizer materials can be used in combination with the selected starch esters to satisfy the desired conditions. Useful plasticizer materials include those containing polar groups such as sulfonamides, carboxylic acids and esters, carboxylate salts, amides, phosphate esters, alcohols i.e., hydroxy containing compounds, epoxides, sulfones, ethers, imides, amines, carbonates, ureas and urethanes. Preferred plasticizers are those containing sulfonamide, alcohol, amide and ester groups which absorb low levels of moisture at high humidity, i.e., have a moisture content of less than about 20%, preferably less than about 15% by weight, at 90% relative humidity and 23° C. The preferred plasticizers do not include the hydrophilic type compounds such as glycerin or sorbitol and other compounds of this type which are hygroscopic and easily pick up moisture. Useful plasticizers include low molecular weight polyesters such as polyethylene glycol and dicarboxylic acids, e.g., adipic acid/succinic acid, poly(hydroxybutyrate-co-valerate), polycaprolactone, alkoxylates of phenol and phenolic derivatives such as ethoxylates of phenol and bisphenol A, and fatty acid amides. The preferred plasticizers are the polyesters of polyethylene glycol and adipic acid or succinic acid and the ethoxylate of bisphenol A.

The coating composition will generally comprise from about 10 to 50% by weight of starch ester, about 0 to 30% by weight of plasticizer and about 20 to 90% by weight water. Preferably the composition will comprise from about 15 to 35% by weight of starch ester, from about 5 to 25% by weight of plasticizer and about 35 to 80% by weight of water. Other components which are conventionally used depending on the application may also be added to the composition including, for example, fillers, antioxidants, stabilizers, surfactants, waxes and dyes or colorants.

The starch ester of this invention is hydrophobic and not water soluble and cannot be dissolved or dispersed in water even at elevated temperatures, e.g., room temperature to 150° C., and therefore cannot be applied or coated as an aqueous solution. Therefore, the starch ester composition is formed into a latex having discrete particles of starch and plasticizer suspended in water. The latex is applied or coated onto the desired substrate and then dried to give a non-continuous film. Heating to a temperature of about the Tg of the starch ester or higher, typically about 100 to 200° C., causes the particles to melt and flow, forming a continuous film on the substrate. Because water does not dissolve the polymer and is not responsible for film formation, heating above the Tg of the starch ester can be done during the drying step and/or anytime after the water is evaporated. The coating can be dried by air drying or using an oven, dryer can or other conventional drying means. The coating can be heated to form a continuous film by techniques such as calendering or thermal processing.

Any conventional coating technique can be used to apply the coating composition to the substrate such as brushing, spreading, dipping, rolling, wire or knife coating. The technique is selected depending on the substrate to be coated. The composition can be applied to the substrate at room temperature or above, preferably about 50 to 75° C., to reduce the viscosity of the formulation and facilitate removal of water. The mixture can also be prepared at ambient temperature or above. Heating the components during formulation helps absorb the plasticizer into the starch particles thereby providing a more uniform dispersion.

The coating composition can be applied to any substrate and is particularly useful for paper products such as those used in food packaging. These starch ester coatings used on paper products provide good moisture vapor barrier properties and because of their biodegradability and other environmental properties allow such products to be repulped and recycled.

The following examples will further illustrate the embodiments of this invention. In these examples all parts are given by weight and all temperatures in degrees Celsius unless otherwise noted.

EXAMPLE I

A coating composition containing the starch esters of this invention was prepared as follows.

Into a 250 ml Erlenmeyer flask, 30.0 g of anhydrous granular starch acetate (70% amylose corn starch with acetate DS=1.3), 10.0 g succinate polyester (Resoflex R-804, Cambridge Industries of America) and tap water were added to bring the total weight to 133.3 g. Using a stainless steel mixing spoon, the contents of the Erlenmeyer were mixed vigorously until the mixture formed a paste. A lead weight was placed around the opening of the flask and the flask placed in a boiling water bath so that the water level was above the material contents. The flask was heated for one hour with occasional stirring and then removed from the boiling water bath and mixed well. Water was added to bring the weight up to the starting tare weight. The mixture was placed back in the boiling water bath until ready for application as shown below.

EXAMPLE II

A sheet of Rhinelander paper label base stock (9"×11") (bases weight; 42#) was placed on a large glass plate and the top edge of the paper taped to the glass plate. The glass plate was laid on a flat horizontal surface and a #15 wire round placed at the top of the paper substrate. The coating material prepared in Example I was removed from the boiling water bath and a ½ inch bead applied across the top of the paper substrate (just below the wire round). The ends of the wire round were grasped and drawn down past the end of the paper substrate while applying light pressure. The paper with coating was removed from the glass plate and placed on a drying ring with the coated side facing down. The center disk was placed onto the drying ring and a weight placed thereon and the coating was allowed to air dry.

The dried paper substrate was removed from the drying ring. The coated substrate was calendered using a heated stainless steel roller with the coated side facing the heated roller. The conditions were 5000 psi (pressure between the rolls), 90° C. (temperature of upper SS roll) and 2 nips (sheet passed through two times).

The coated label base stock was evaluated for water vapor transmission rate (MVTR) using TAPPI T448 om-89 as follows:

1. Place desiccant in the test container (No. 68-1, Thwing Albert Instrument Co.) to fill the container within 5 mm of top,
2. Cut 3 inch diameter circle out of sample sheet to be tested,
3. Place test sheet coated side down on the test container,
4. Place top ring on the test container and screw down,
5. Place test container in a humidity cabinet at 50% relative humidity and 23° C.,
6. Remove the sample at given intervals (24 hours) and record weight.
7. Calculate the water vapor transmission rate as follows:

$$MVTR = g/(m^2)(day) = x/Ay$$

where
x=gain for time period (y) in grams
y=time for the gain in days
A=exposed area of specimen ($m^2$).

Table 1 below shows the improved water vapor transmission rate (MVTR) using the coating composition as prepared in Example I (starch acetate DS=1.3) and a similar coating composition using an acid degraded fluidity high amylose (70%) corn starch (Acetate DS=1.5).

TABLE 1

| Moisture Vapor Transmission Rate at 50% RH, 23° C. | |
| --- | --- |
| Sample | MVTR (g/m²/day) |
| Base (no coating) | 170.5 |
| Starch Acetate (DS = 1.3) | 97.19 |
| Fluidity Starch Acetate (DS = 1.5) | 85.10 |

EXAMPLE III

A coating composition containing the starch ester of this invention was prepared as follows.

Into a 250 ml Erlenmeyer flask, 50.0 g of anhydrous granular starch acetate (70% amylose corn starch with acetate DS=1.3), 16.7 g ethoxylated bis-phenol A (Macol 206-EM, PPG Industries) and tap water were added to bring the total weight to 150.7 g. Using a stainless steel mixing spoon, the contents of the Erlenmeyer were mixed vigorously until the mixture formed a paste. A lead weight was placed around the opening of the flask and the flask placed in a boiling water bath so that the water level was above the material contents. The flask was heated for two hours with occasional stirring and then removed from the boiling water bath and mixed well. Water was added to bring the weight up to the starting tare weight. The mixture was placed back in the boiling water bath until ready for application as described below.

A sheet of Rhinelander paper label base stock (9"×11") was placed on a large glass plate and the top edge of the paper taped to the glass plate. The glass plate was laid on a flat horizontal surface and a #9 wire round placed at the top of the paper substrate. The coating material prepared above was removed from the boiling water bath and a ½ inch bead applied across the top of the paper substrate (just below the wire round). The ends of the wire round were grasped and drawn down past the end of the paper substrate while applying light pressure. The paper with coating was removed from the glass plate and placed on a drying ring with the coated side facing down. The center disk was placed onto the drying ring and a weight placed thereon and the coating was allowed to dry. The dried paper substrate was removed from the drying ring. The coated substrate was calendered using a heated stainless steel roller with the coated side facing the heated roller. The conditions were 5000 psi (pressure between the rolls), 90° C. (temperature of upper SS roll) and 2 nips (sheet passed through two times).

The label base stock coated with the starch acetate composition as described above as well as a coated copy material with the same coating were both evaluated for physical properties i.e., High Pressure (HP) Gurley and Hercules Size Test (HST). In a similar manner, paper coated with a starch propionate (DS=1.3) composition was evaluated and the results given below in Table 2.

TABLE 2

| | Label Base Stock | | Copy Paper | |
| --- | --- | --- | --- | --- |
| Sample | HP Gurley | HST | HP Gurley | HST |
| Starch Acetate | >100,000 sec. | 82 sec. | 42 sec. | 22 sec |
| Starch Propionate | >100,000 sec. | 92 sec. | 65 sec. | 40 sec |
| No Coating | 800 sec. | 27 sec. | 11.1 sec. | 10 sec |

What is claimed is:

1. A moisture vapor barrier coating composition comprising a latex of discrete particles of starch and hydrophobic plasticizer suspended in water wherein:
    a) the starch is a starch ester having 2 to 8 carbon atoms in the ester component and a degree of substitution of 1.1 to 2.2; and
    b) the hydrophobic plasticizer is a non-volatile, polar organic material that is compatible with the starch ester and is present in sufficient amount to lower the $T_g$ of the starch ester to a temperature of about 75 to 200° C.

2. The composition of claim 1 which comprises from about 15 to 35% by weight of starch ester, from about 5 to 25% by weight of plasticizer and from about 35 to 80% by weight of water.

3. The composition of claim 1 wherein the starch ester has a DS of from 1.2 to 1.9.

4. The composition of claim 1 wherein the starch ester has 2 to 5 carbon atoms in the ester component.

5. The composition of claim 1 which comprises from about 10 to 50% by weight of starch ester, about 0 to 30% by weight of plasticizer and about 20 to 90% by weight water.

6. The composition of claim 5 wherein the starch ester has the formula:

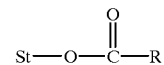

where St is the starch base material and R is an alkyl, aryl, alkenyl, alkaryl or aralkyl of 1 to 7 carbon atoms.

7. The composition of claim 6 wherein the starch ester has a DS of from 1.2 to 1.9.

8. The composition of claim 1 which comprises from about 10 to 50% by weight of starch ester, about 0 to 30% by weight of plasticizer and about 20 to 90% by weight water.

9. The composition of claim 8 wherein the plasticizer contains a polar group selected from the group consisting of a sulfonamide, alcohol, amide or ester group.

10. A process for preparing a moisture vapor barrier coated substrate comprising:

a) providing a moisture vapor barrier coating composition comprising an aqueous dispersion of the starch ester coating composition of claim 1, b) applying the coating composition to a substrate, c) heating the coated substrate to a temperature at or above the Tg of the starch ester to melt the particles and form a continuous film.

11. The process of claim 10 wherein the coated substrate is dried prior to heating.

12. The process of claim 10 wherein the coating composition has the composition of claim 5.

13. The process of claim 12 wherein the starch ester has a DS of from 1.2 to 1.9.

14. The process of claim 10 wherein the substrate is paper.

15. The process of claim 14 wherein the coating composition has the composition of claim 5.

16. A moisture vapor barrier coated product prepared by the method of claim 10.

17. The coated product of claim 16 wherein the substrate is paper.

18. The coated product of claim 17 wherein the coating composition has the composition of claim 8.

* * * * *